(12) United States Patent
Hagstedt

(10) Patent No.: US 7,248,967 B2
(45) Date of Patent: Jul. 24, 2007

(54) AUTONOMOUS VELOCITY ESTIMATION AND NAVIGATION

(75) Inventor: Anders Hagstedt, Linköping (SE)

(73) Assignee: SAAB AB, Linköping (SE)

( * ) Notice: Subject to any disclaimer, the term of this patent is extended or adjusted under 35 U.S.C. 154(b) by 11 days.

(21) Appl. No.: 10/919,305

(22) Filed: Aug. 17, 2004

(65) Prior Publication Data

US 2005/0143949 A1    Jun. 30, 2005

(30) Foreign Application Priority Data

Aug. 18, 2003    (EP) .................................. 03018559

(51) Int. Cl.
*G01C 17/38*    (2006.01)

(52) U.S. Cl. .............. 701/220; 701/5; 701/7; 701/11; 701/200; 244/165; 244/3.1; 244/3.2; 73/488; 73/510; 702/95

(58) Field of Classification Search ................... 702/95
See application file for complete search history.

(56) References Cited

U.S. PATENT DOCUMENTS 4,910,526 A * 3/1990 Donnangelo et al. ....... 342/455
6,170,344 B1    1/2001 Ignagni
6,421,622 B1    7/2002 Horton et al.
6,449,559 B2    9/2002 Lin
6,496,779 B1 * 12/2002 Hwang ...................... 701/220

\* cited by examiner

*Primary Examiner*—John Barlow
*Assistant Examiner*—Sujoy Kundu
(74) *Attorney, Agent, or Firm*—Venable LLP; Eric J. Franklin

(57) ABSTRACT

Measurement of a spatial velocity vector in order to make determination of a geographical position possible. A spatial velocity meter includes an inertial measurement unit, a direction-sensing module and a velocity processor. The inertial measurement unit registers acceleration parameters and angular velocity parameters in three dimensions. The direction-sensing module registers a natural reference signal. The velocity processor receives the acceleration parameters, the angular velocity parameters and the natural reference signal, and based thereon, generates the spatial velocity vector.

19 Claims, 2 Drawing Sheets

AUTONOMOUS VELOCITY ESTIMATION AND NAVIGATION

CROSS-REFERENCE TO RELATED APPLICATIONS

This application claims priority from European patent application 03018559.9 filed 18 Aug. 2003.

THE BACKGROUND OF THE INVENTION AND PRIOR ART

The present invention relates generally to navigation and velocity estimation in crafts and vehicles. More particularly the invention relates to a spatial velocity meter, a navigation arrangement, a method for spatial velocity estimation and a navigation method. The invention also relates to computer programs and respective computer readable media.

In the last decades, navigation systems have been developed which facilitate the determination of a position dramatically compared to the earlier known methods. These navigation systems determine positions on basis of accurate radio signals received from a plurality of satellites, and are commonly referred to as global navigation satellite systems (GNSS:s).

An alternative or complementary way to navigate and determine a craft's movement can be provided by an inertial measurement system (INS). The INS registers relative movements of the craft. Based on these movements, in turn, conclusions may be drawn as to the craft's speed and course. In case certain initial conditions are known, such as data defining a starting position and an initial speed, it is also possible to produce updated position information for the craft. The INS normally contains an inertial measurement unit (IMU), which in turn includes accelerometers and rate gyros. The accelerometers measure specific forces which are translated to a known coordinate frame with aid of angular measurements performed by the rate gyros. Newton's laws of motion are applied to generate velocity and attitude information.

The U.S. Pat. No. 6,449,559 describes a fully coupled positioning solution, wherein INS data is integrated with GPS data by means of a Kalman filter. Thereby, a positioning accuracy may be achieved, which is better than what would be possible to attain with a GPS receiver only.

The U.S. Pat. No. 6,170,344 discloses a purely IMU-based system for monitoring distortions in a pipeline. A so-called pipeline pig is here used to register parameters relating to accelerations and angular velocities. Based on these data, and a set of initial conditions in the form of an initial attitude matrix and an initial velocity vector, a Kalman filter is used to provide i.a. a velocity vector.

Hence, the prior art includes various solutions for positioning and determination of a craft's velocity based on IMU data. However, there is yet no example of a solution through which an accurate velocity vector may be determined without the input of artificially generated external information. Namely, either reception of GPS signals (or equivalent GNSS signals) is required, or an initial velocity vector must be supplied. This renders the known solutions comparatively vulnerable and sensitive to disturbances and spoofing.

SUMMARY OF THE INVENTION

The object of the present invention is therefore to provide an autonomous solution, which alleviates the problem above and thus provides a velocity vector without any artificially generated external information being required.

It is also an object of the invention to provide an autonomous navigation solution, which renders it possible to determine updated positions in the absence of information pertaining to an initial speed.

According to one aspect of the invention these objects are achieved by the initially described spatial velocity meter, which is characterized in that it comprises a direction-sensing module which is adapted to register a natural reference signal. Moreover, the velocity processor is adapted to receive the natural reference signal and determine the velocity vector on further basis of this signal. Thus, by means of the natural reference signal, attitude, velocity and acceleration of a craft may repeatedly be determined, and one or more velocity vectors may be expressed in relation to the earth.

Obviously, an important advantage attained thereby is that the velocity meter becomes robust and reliable, since it is independent from any artificially generated external input.

According to a preferred embodiment of this aspect of the invention, the direction-sensing module includes a magnetic measurement unit, which is adapted to register a field vector of the terrestrial magnetic field to represent the natural reference signal. Consequently, the velocity processor is adapted to receive the field vector and determine the velocity vector on further basis of this vector.

According to another preferred embodiment of this aspect of the invention, the velocity meter is adapted to be mounted in a craft in order to register the craft's spatial velocity along a longitudinal body axis of the craft. The velocity processor is adapted to implement an estimation procedure, for instance by means of a Kalman filter, which in turn is adapted to derive the at least one velocity vector based on a relationship between three dimensional forces and three dimensional angular velocities in respect of an axis being parallel to the longitudinal body axis of the craft. A velocity meter of this type is advantageous because thereby relevant velocity vectors and attitude angles, e.g. expressing roll and pitch, may be efficiently generated.

According to a preferred embodiment of this aspect of the invention, the velocity meter contains a plumb-bob module which is adapted to receive the acceleration parameters. In response to these parameters, the plumb-bob module produces a set of initial attitude parameters. Preferably, the velocity meter also contains an attitude-updating module, which is adapted to receive the set of initial attitude parameters and the angular velocity parameters. Based on these parameters, the attitude-updating module produces a set of updated attitude parameters.

According to a preferred embodiment of this aspect of the invention, the spatial velocity meter includes an error estimation module, which is adapted to receive the set of updated attitude parameters, the acceleration parameters and the angular velocity parameters. Based on these parameters, the error estimation module produces a craft velocity and at least one adjusted attitude angle. The proposed error estimation module is advantageous because thereby it possible to determine the amounts and signs of any measurement errors, and perform relevant adjustments.

According to a preferred embodiment of this aspect of the invention, the spatial velocity meter contains a course calculation module, which is adapted to receive the natural reference signal and the at least one adjusted attitude angle. Based thereon, the course calculation module produces a course angle, i.e. an angle expressing a course in relation to an absolute geographical reference. Naturally, this angle constitutes desirable information in most navigation applications.

According to a preferred embodiment of this aspect of the invention, the spatial velocity meter contains a velocity transform module, which is adapted to receive the craft velocity, the at least one adjusted attitude angle and the course angle. Based thereon, the velocity transform module produces the velocity vector, for example according to the so-called North/East/Down coordinate frame. This is desirable because it renders it possible to express a craft's velocity in absolute terms with respect to a well-known reference.

According to another aspect of the invention these objects are achieved by the initially described navigation arrangement, which is characterized in that it includes the above proposed spatial velocity meter, which is adapted to produce the spatial velocity vector.

According to yet another aspect of the invention these objects are achieved by the initially described velocity estimation method, which is characterized by the steps of: registering a natural reference signal (e.g. by registering a field vector of the terrestrial magnetic field, or by other means receiving an initial heading input); and determining a velocity vector on basis of the acceleration parameters, the angular velocity parameters and the natural reference signal.

The advantages of this method are apparent from the discussion hereinabove with reference to the proposed velocity meter.

According to a further aspect of the invention these objects are achieved by a computer program directly loadable into the internal memory of a computer, comprising software for controlling the above proposed velocity estimation method when said program is run on a computer.

According to another aspect of the invention these objects are achieved by a computer readable medium, having a program recorded thereon, where the program is to make a computer control the above proposed velocity estimation method.

According to yet another aspect of the invention these objects are achieved by the initially described navigation method, which is characterized by estimating the spatial velocity according to the above proposed procedure.

According to a further aspect of the invention these objects are achieved by a computer program directly loadable into the internal memory of a computer, comprising software for controlling the above proposed navigation method when said program is run on a computer.

According to another aspect of the invention these objects are achieved by a computer readable medium, having a program recorded thereon, where the program is to make a computer control the above proposed navigation method.

Thereby, the invention offers a speed measurement and navigation tool for critical applications wherein a high accuracy and a high reliability is desired, and at the same time, independence from artificially generated external inputs is required.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
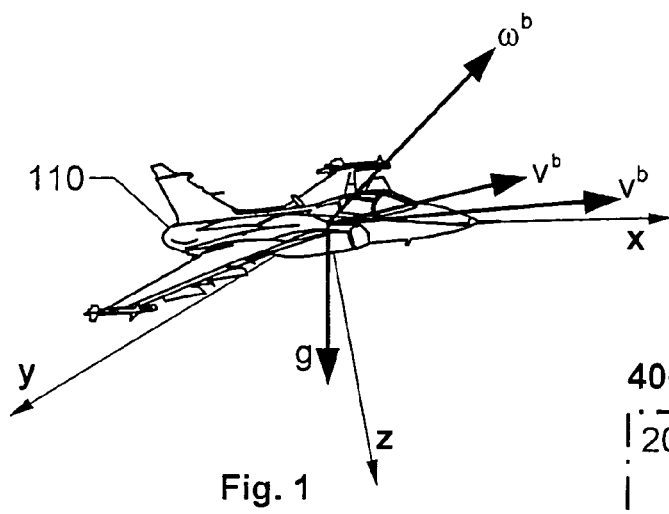
FIG. 1 shows a craft in relation to a coordinate system and a set of vectors being representative for the solution according to the invention.

FIG. 1 shows a craft 110 in relation to a coordinate system x, y and z. A set of vectors is illustrated, which describes the movement of the craft's 110 body. This set of vectors includes a gravitation vector $g^b$, a velocity vector $v^b$, an acceleration vector $\dot{v}^b$ and an angular velocity vector $\omega^b$. An IMU in the craft 110 is presumed to measure a specific force vector $f_s^b$ (e.g. force per unit mass), which may be expressed:

$$f_s^b = -g^b + \dot{v}^b + \omega^b \times v^b.$$

In so-called body-fixed coordinates, i.e. coordinates described in relation to the body of the craft 110, the gravitation vector $g^b$ is given by:

$$g^b = c_n^b \cdot g^n = c_{n'}^b \cdot c_n^{n'} \cdot g^n = c_{n'}^b \cdot \begin{bmatrix} -\sin(d\theta) \\ \sin(d\phi)\cos(d\theta) \\ \cos(d\phi)\cos(d\theta) \end{bmatrix} \cdot g,$$

where $c_n^b$ denotes a transformation matrix from an actual local system n to an actual body fixed system b, $c_{n'}^b$ is a body attitude transformation matrix calculated by the proposed velocity processor, $C_n^{n'}$ is a transformation matrix from the actual local system n to a calculated local level system n' represented by the calculated transformation to the actual body fixed system b, and dφ and dθ constitute attitude errors as defined by rotations from the actual local system n to the calculated local level system n' about x- and y-axes in a horizontal plane in relation to the body.

Thus, provided that the force vector $f_s^b$ is expressed as three linear sub vectors $f_x$, $f_y$ and $f_z$, this gives:

$$\begin{bmatrix} f_x \\ f_y \\ f_z \end{bmatrix} = -\begin{bmatrix} c_{11} & c_{12} & c_{13} \\ c_{21} & c_{22} & c_{23} \\ c_{31} & c_{32} & c_{33} \end{bmatrix} \cdot \begin{bmatrix} -\sin(d\theta) \\ \sin(d\phi)\cos(d\theta) \\ \cos(d\phi)\cos(d\theta) \end{bmatrix} \cdot g + \begin{bmatrix} \dot{v}_x \\ \dot{v}_y \\ \dot{v}_z \end{bmatrix} + \begin{bmatrix} 0 & -\omega_z & \omega_y \\ \omega_z & 0 & -\omega_x \\ -\omega_y & \omega_x & 0 \end{bmatrix} \cdot \begin{bmatrix} v_x \\ v_y \\ v_z \end{bmatrix}$$

where $$\begin{bmatrix} c_{11} & c_{12} & c_{13} \\ c_{21} & c_{22} & c_{23} \\ c_{31} & c_{32} & c_{33} \end{bmatrix}$$

is the transform matrix $c_n{}^b$, $\dot{v}_x$, $\dot{v}_y$ and $\dot{v}_z$ are three linearly independent sub vectors of the acceleration vector $\dot{v}^b$, $$\begin{bmatrix} 0 & -\omega_z & \omega_y \\ \omega_z & 0 & -\omega_x \\ -\omega_y & \omega_x & 0 \end{bmatrix}$$

is a matrix which represents the angular velocity vector $\omega^b$, and $v_x$, $v_y$ and $v_x$ are three linearly independent sub vectors of the velocity vector $V^b$, By assuming that the main velocity component v is aligned with the body axis x, and that $d\phi$ and $d\theta$ are relatively small, the following expression is obtained:

$$\begin{bmatrix} f_x \\ f_y \\ f_z \end{bmatrix} = \qquad (1)$$

$$-\begin{bmatrix} c_{11} & c_{12} & c_{13} \\ c_{21} & c_{22} & c_{23} \\ c_{31} & c_{32} & c_{33} \end{bmatrix} \cdot \begin{bmatrix} -d\theta \\ d\phi \\ 1 \end{bmatrix} \cdot g + \begin{bmatrix} \dot{v} \\ 0 \\ 0 \end{bmatrix} + \begin{bmatrix} 0 & -\omega_z & \omega_y \\ \omega_z & 0 & -\omega_x \\ -\omega_y & \omega_x & 0 \end{bmatrix} \cdot \begin{bmatrix} v \\ 0 \\ 0 \end{bmatrix}$$

which may also be expressed as:

$$\begin{bmatrix} f_x \\ f_y \\ f_z \end{bmatrix} + \begin{bmatrix} g \cdot c_{13} \\ g \cdot c_{23} \\ g \cdot c_{33} \end{bmatrix} = \begin{bmatrix} g \cdot c_{11} & -g \cdot c_{12} & 0 & 1 \\ g \cdot c_{21} & -g \cdot c_{22} & \omega_z & 0 \\ g \cdot c_{31} & -g \cdot c_{32} & -\omega_y & 0 \end{bmatrix} \cdot \begin{bmatrix} d\theta \\ d\phi \\ v \\ \dot{v} \end{bmatrix} \qquad (2)$$

where $C_{11}$, $C_{12}$, $C_{13}$, $C_{21}$, $C_{22}$, $C_{23}$, $C_{31}$, $c_{32}$, and $C_{33}$ represent the components of the body attitude transformation matrix $c_n{}^b$ calculated by the proposed velocity processor, g is regarded as known, or is a measured parameter representing the gravitation vector, $d\phi$ and $d\theta$ are sought data in the form of errors in the calculated body attitude transformation matrix $c_n{}^b$, $f_x$, $f_y$ and $f_z$ represent data from the IMU in the form of forces in three dimensions, $\omega_z$ and $\omega_y$ represent data from the IMU in the form angular rates about the body axes, and v and $\dot{v}$ represent the desired output data in the form of velocity and acceleration respectively.

According to a preferred embodiment of the invention, the attitude transformation errors $d\phi$ and $d\theta$, the velocity data v and the acceleration data $\dot{V}$ in (2) (or (1)) are calculated repeatedly by means of an estimation function, which may be implemented as a Kalman filter. By registering a course angle in relation to an external reference which exists naturally (e.g. by registering a field vector of the terrestrial magnetic field, or by other means receiving initial heading data), the velocity and acceleration parameters v and $\dot{V}$ can be related to an external reference, such that a calculated velocity vector may be expressed in relation to the earth. This will be further explained below with reference to the FIGS. 2 and 3.

Figure 2:
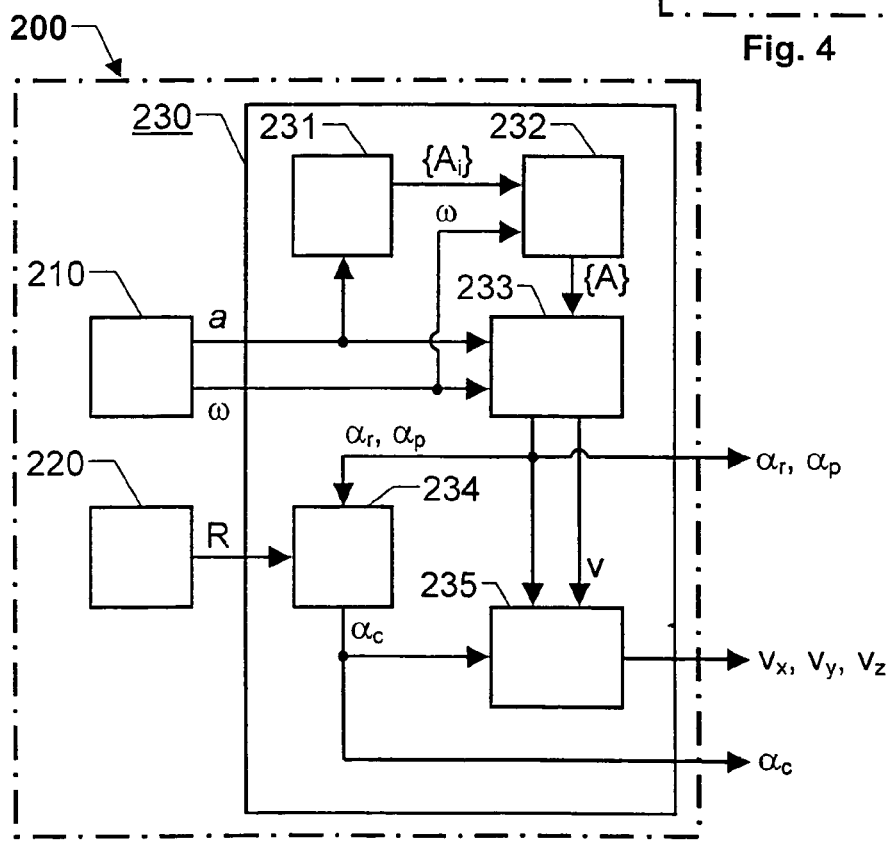
FIG. 2 shows a block diagram over a spatial velocity meter according to an embodiment of the invention.

FIG. 2 shows a block diagram over a spatial velocity meter 200 according to an embodiment of the invention, which includes an inertial measurement unit 210, a direction-sensing module 220 and a velocity processor 230.

The inertial measurement unit 210 is adapted to register acceleration specific parameters a and angular velocity parameters ω in three dimensions x, y and z. The direction-sensing module 220 is adapted to register a natural reference signal R upon which a course angle $\alpha_c$ may be determined. Thus, the direction-sensing module 220 may include a magnetic measurement unit 220 which registers a field vector of the terrestrial magnetic field, and delivers this parameter to the velocity processor 230. Alternatively, the direction-sensing module 220 may receive a natural reference signal R in the form of an initial heading input, for instance via a manual entry, and forward this information to the velocity processor 230.

Besides the natural reference signal R, the velocity processor 230 receives the acceleration parameters a and the angular velocity parameters ω. Based on these parameters a, ω and R, the velocity processor 230 generates attitude angles of the craft 110 and a velocity vector $v_x$, $v_y$, $v_z$, which expresses a velocity in relation to the earth, for instance by means of the above-mentioned estimation function.

The velocity processor 230, in turn, may include a plumb-bob module 231 which is adapted to receive the acceleration parameters a. In response to these parameters a, the plumb-bob module 231 produces a set of initial attitude parameters $\{A_i\}$ representing an initial attitude of the craft in which the velocity meter 200 is mounted. An attitude-updating module 232 in the velocity processor 230 receives the set of initial attitude parameters $\{A_i\}$ and the angular velocity parameters ω. On basis thereof, the attitude updating module 232 produces a set of updated attitude parameters $\{A\}$, which represent a current orientation of the craft.

Preferably, the velocity processor 230 includes an error estimation module 233, which is adapted to receive the set of updated attitude parameters $\{A\}$, the acceleration parameters a and the angular velocity parameters ω. Based on these parameters $\{A\}$, a and ω, the error estimation module 233 produces a craft velocity v plus adjusted attitude angles $\alpha_r$ and $\alpha_p$. The adjusted attitude angles $\alpha_r$ and $\alpha_p$ express appropriate correction angles with respect to the orientation of the craft, for example in terms of a roll angle $\alpha_r$ and a pitch angle $\alpha_p$.

Moreover, it is preferable if the velocity processor 230 includes a course calculation module 234 and a velocity transform module 235. The course calculation module 234 receives the natural reference signal R plus the adjusted attitude angles $\alpha_r$ and $\alpha_p$, and based thereon, produces a course angle $\alpha_c$. The velocity transform module 235 receives the course angle $\alpha_c$, the craft velocity v and the adjusted attitude angles $\alpha_r$, and $\alpha_p$. Based thereon, the velocity transform module 235, in turn, produces the at least one velocity $v_x$, $v_y$, and $v_z$ in relation to the earth, which may be further used to generate positioning information. The details regarding this will be discussed below with reference to the FIGS. 4 and 5.

A method of estimating a spatial velocity performed by the velocity meter described above is illustrated in FIG. 3 by means of a flow diagram. A first step 310 registers acceleration parameters and angular velocity parameters in three dimensions. Subsequently, or in parallel, a step 320 registers a natural reference signal. Finally, a step 330 determines a velocity vector on basis of the acceleration parameters, the angular velocity parameters and the natural reference signal. The velocity vector is generated by applying the equation (2) (or (1)) above in an estimation process which also may take into account any additional knowledge about the dynamics of the application. The procedure then loops back to the step 310.

According to a preferred embodiment of the invention, in a first run-through of the sequence, the step 330 involves the sub-step of producing a set of initial attitude parameters in response to the acceleration parameters. In each subsequent run-through of the sequence, however, a set of updated attitude parameters is produced on basis of a set of current angular velocity parameters received via the step 310.

It is also preferable if the step 330 involves the further sub-steps of producing a craft velocity and at least one adjusted attitude angle on basis of the updated attitude parameters, the acceleration parameters and the angular velocity parameters. Namely, based on the natural reference signal and the at least one adjusted attitude angle, yet a sub-step may calculate a course angle describing a course in relation to an absolute geographical reference. Moreover, the step 330 preferably involves a sub-step of producing the velocity vector on basis of the craft velocity, the at least one adjusted attitude angle and the course angle.

Figure 4:
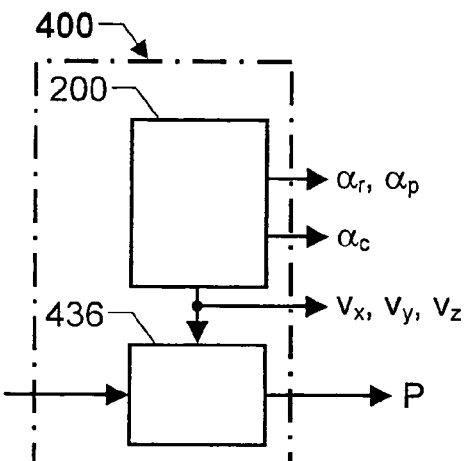
FIG. 4 shows a block diagram over a navigation arrangement according to an embodiment of the invention.

FIG. 4 shows a block diagram over a navigation arrangement 400 according to an embodiment of the invention. The navigation arrangement 400 includes the proposed spatial velocity meter 200 for producing a velocity vector $v_x$, $v_y$ and $v_z$, and an integrator module 436, which on one hand, receives the velocity vector $v_x$, $v_y$ and $v_z$, and on the other hand, receives an initial position coordinate $P_i$ indicating a geographic starting point for a craft. The integrator module 436 repeatedly generates an updated position coordinate P based on the initial position coordinate $P_i$ and updated values of the velocity vector $v_x$, $v_y$ and $v_z$.

Figure 5:
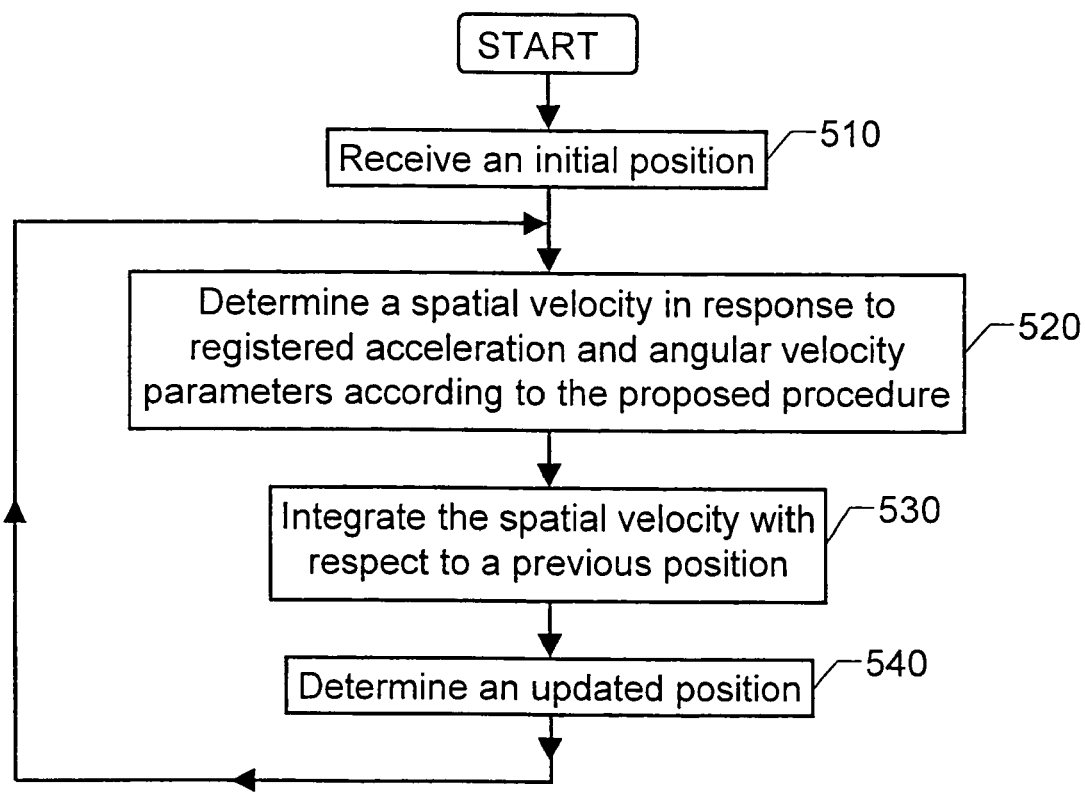
FIG. 5 illustrates, by means of a flow diagram, a general method of navigating according to the invention.

FIG. 5 illustrates, by means of a flow diagram, a general method of navigating according to the invention.

A first step 510 receives an initial position coordinate. Then, a step 520 determines a spatial velocity based on registered acceleration parameters and registered angular velocity parameters according to the proposed procedure, i.e. as described above with reference to the FIG. 3. After that, a step 530 integrates the spatial velocity vector with respect to a previous position (which primary is equal to the initial position coordinate received in the step 510). Subsequently, a step 540 determines an updated position coordinate based on the integration, where after the procedure loops back to the step 520.

Figure 3:
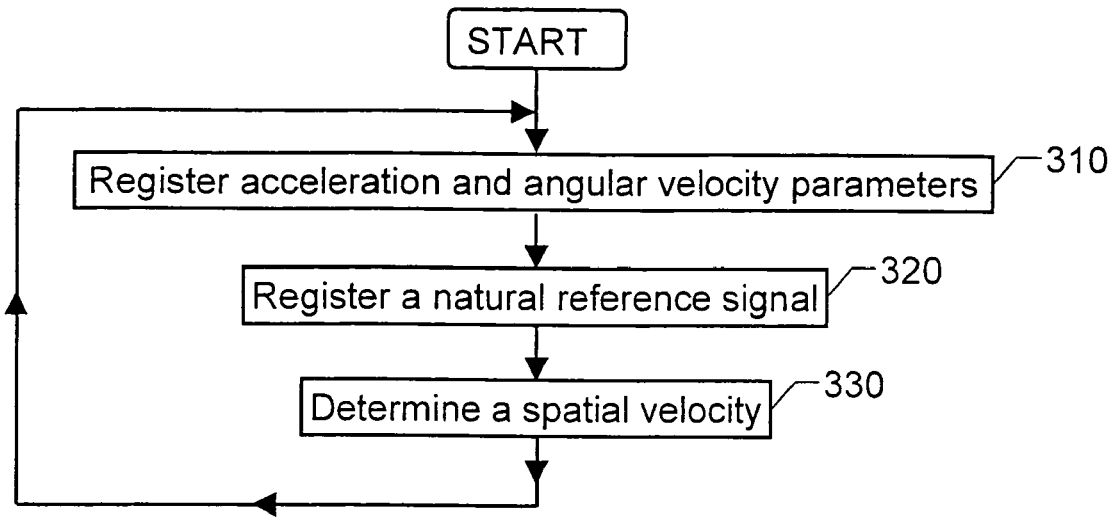
FIG. 3 illustrates, by means of a flow diagram, a general method of estimating a spatial velocity according to the invention.

All of the process steps, as well as any sub-sequence of steps, described with reference to the FIGS. 3 and 5 above may be controlled by means of a programmed computer apparatus, preferably located in the proposed navigation arrangement. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The carrier may be any entity or device capable of carrying the program. For example, the carrier may comprise a storage medium, such as a ROM (Read Only Memory), for example a CD (Compact Disc) or a semiconductor ROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A spatial velocity meter adapted to be mounted on a craft, the spatial velocity meter comprising:
   an inertial measurement unit adapted to register acceleration parameters and angular velocity parameters in three dimensions;
   a direction-sensing module adapted to register a natural reference signal; and
   a velocity processor adapted to receive the acceleration parameters, receive the angular velocity parameters, receive the natural reference signal, and generate a velocity vector of the craft in relation to the earth based at least on the acceleration parameters, the angular velocity, the natural reference signal, and a main velocity component of the craft being aligned with a longitudinal axis of the craft.

2. The spatial velocity meter according to claim 1, wherein the direction-sensing module comprises a magnetic measurement unit which is adapted to register a field vector of the terrestrial magnetic field to represent the natural reference signal, and the velocity processor is adapted to receive the field vector and determine the velocity vector on further basis of the field vector.

3. The spatial velocity meter according to claim 1, wherein the spatial velocity meter is adapted to register a spatial velocity of the craft, and the velocity processor is adapted to implement an estimation procedure, which in turn is adapted to derive the velocity vector based on a relationship between three dimensional forces and three dimensional angular velocities in respect of an axis being parallel to a longitudinal body axis of the craft.

4. The spatial velocity meter according to claim 1, further comprising:
   a plumb-bob module adapted to receive the acceleration parameters and in response thereto produce a set of initial attitude parameters.

5. The spatial velocity meter according to claim 4, further comprising:
   an attitude updating module adapted to receive the set of initial attitude parameters, receive the angular velocity parameters and based thereon produce a set of updated attitude parameters.

6. The spatial velocity meter according to claim 5, further comprising:

an error estimation module adapted to receive the set of updated attitude parameters, receive the acceleration parameters, receive the angular velocity parameters, and based thereon produce a craft velocity and at least one adjusted attitude angle.

7. The spatial velocity meter according to claim 6, further comprising:
a course calculation module adapted to receive the natural reference signal, receive the at least one adjusted attitude angle, and based thereon produce a course angle.

8. The spatial velocity meter according to claim 7, further comprising:
a velocity transform module adapted to receive the craft velocity, receive the at least one adjusted attitude angle, receive the course angle, and based thereon produce the velocity vector.

9. A navigation arrangement for determining a geographical position of a craft, the navigation arrangement comprising:
a spatial velocity meter adapted to be mounted on the craft and comprising an inertial measurement unit adapted to register acceleration parameters and angular velocity parameters in three dimensions, a direction-sensing module adapted to register a natural reference signal, and a velocity processor adapted to receive the acceleration parameters, receive the angular velocity parameters, receive the natural reference signal, and generate a velocity vector of the craft in relation to the earth based at least on the acceleration parameters, the angular velocity, the natural reference signal, and a main velocity component of the craft being aligned with a longitudinal axis of the craft; and
an integrator module adapted to receive an initial position coordinate, receive the velocity vector from the spatial velocity meter, and based thereon, generate an updated position coordinate.

10. A method for spatial velocity estimation of a craft, the method comprising:
registering acceleration parameters and angular velocity parameters of the craft in three dimensions;
registering a natural reference signal;
determining a velocity vector for the craft in relation to the earth based on the acceleration parameters, the angular velocity parameters, the natural reference signal, and a main velocity component of the craft being aligned with a longitudinal axis of the craft and
determining an updated position of the craft based on the natural reference signal and the velocity vector.

11. The method according to claim 10, wherein the registration of the natural reference signal involves registering a field vector of the terrestrial magnetic field; and the determination of the velocity vector being based on the field vector.

12. The method according to claim 10, further comprising:
producing a set of initial attitude parameters in response to the acceleration parameters.

13. The method according to claim 12, further comprising:
producing a set of updated attitude parameters on basis of the set of initial attitude parameters and the angular velocity parameters.

14. The method according to claim 13, further comprising:
producing a craft velocity and at least one adjusted attitude angle on basis of the updated attitude parameters, the acceleration parameters, and the angular velocity parameters.

15. The method according to claim 14, further comprising:
calculating a course angle on basis of the natural reference signal and the at least one adjusted attitude angle.

16. The method according to claim 15, further comprising:
producing the velocity vector on further basis of the craft velocity, the at least one adjusted attitude angle, and the course angle.

17. A computer program product, comprising:
a computer readable medium; and
computer program instructions recorded on the computer readable medium and executable by a processor for carrying out the steps of
registering acceleration parameters and angular velocity parameters of a craft in three dimensions;
registering a natural reference signal;
determining a velocity vector for the craft in relation to the earth based on the acceleration parameters, the angular velocity parameters, the natural reference signal, and a main velocity component of the craft being aligned with a longitudinal axis of the craft; and
determining an updated position of the craft based on the natural reference signal and the velocity vector.

18. A navigation method for navigating a craft, the method comprising:
receiving an initial position coordinate for the craft;
registering acceleration parameters and angular velocity parameters in three dimensions for the craft;
estimating a spatial velocity for the craft in relation to the earth based on at least the acceleration and the angular velocity parameters; and
determining an updated position coordinate for the craft based on the initial position coordinate and an integration of the velocity vector, comprising estimating the spatial velocity by registering a natural reference signal and determining a velocity vector for the craft in relation to the earth based on the acceleration parameters, the angular velocity parameters, the natural reference signal, and a main velocity component of the craft being aligned with a longitudinal axis of the craft, and determining an updated position of the craft based on the natural reference signal and the velocity vector.

19. A computer program product, comprising:
a computer readable medium;
computer program instructions recorded on the computer readable medium and executable by a process for carrying out the steps of
receiving an initial position coordinate for the craft;
registering acceleration parameters and angular velocity parameters in three dimensions for the craft;
estimating a spatial velocity for the craft in relation to the earth based on at least the acceleration and the angular velocity parameters; and
determining an updated position coordinate for the craft based on the initial position coordinate and an integration of the velocity vector, comprising estimating the spatial velocity by registering a natural reference signal and determining a velocity vector for the craft in relation to the earth based on the acceleration parameters, the angular velocity parameters, the natural reference signal, and a main velocity component of the craft being aligned with a longitudinal axis of the craft, and determining an updated position of the craft based on the natural reference signal and the velocity vector.

* * * * *